US012563137B2

(12) United States Patent
Baji

(10) Patent No.: US 12,563,137 B2
(45) Date of Patent: Feb. 24, 2026

(54) STREAMING METHOD AND SYSTEM FOR MOBILE ELECTRONIC DEVICE DIAGNOSTICS

(71) Applicant: BLANCCO TECHNOLOGY GROUP IP OY, Joensuu (FI)

(72) Inventor: Rahul Baji, Maharashtra (IN)

(73) Assignee: BLANCCO TECHNOLOGY GROUP IP OY, Joensuu (FI)

( * ) Notice: Subject to any disclaimer, the term of this patent is extended or adjusted under 35 U.S.C. 154(b) by 389 days.

(21) Appl. No.: 18/022,083

(22) PCT Filed: Jul. 29, 2021

(86) PCT No.: PCT/EP2021/071279
§ 371 (c)(1),
(2) Date: Feb. 17, 2023

(87) PCT Pub. No.: WO2022/037918
PCT Pub. Date: Feb. 24, 2022

(65) Prior Publication Data
US 2023/0308533 A1     Sep. 28, 2023

(30) Foreign Application Priority Data
Aug. 18, 2020     (GB) ..................................... 2012898

(51) Int. Cl.
*H04M 1/24*          (2006.01)
*H04W 8/22*          (2009.01)
(52) U.S. Cl.
CPC ............... *H04M 1/24* (2013.01); *H04W 8/22* (2013.01)
(58) Field of Classification Search
CPC ...... H04M 1/24; H04W 8/22; H04W 455/425
See application file for complete search history.

(56) References Cited

U.S. PATENT DOCUMENTS 6,338,148 B1 *  1/2002  Gillenwater ........ G06F 11/2273
                                                              714/25
7,630,708 B2 *  12/2009  So ........................... H04M 1/24
                                                              455/67.11
(Continued)

FOREIGN PATENT DOCUMENTS

CA          3000710 A1 *  7/2010  ......... G01R 31/3177
JP      2003022196        1/2003
(Continued)

OTHER PUBLICATIONS

Notification Concerning Transmittal of International Preliminary Report on Patentability (Chapter 1 of the Patent Cooperation Treaty) dated Mar. 2, 2023 (Mar. 2, 2023) issued on related international patent application PCT/EP2021/071279 by the International Bureau of WIPO.

(Continued)

*Primary Examiner* — Khai M Nguyen
(74) *Attorney, Agent, or Firm* — DICKINSON WRIGHT PLLC

(57)          ABSTRACT

A method for use in performing a diagnostic test on a mobile electronic device, comprises: (i) transmitting, from a server to the mobile electronic device, data defining a portion of an algorithm, the algorithm defining the diagnostic test; (ii) executing, on the mobile electronic device, the portion of the algorithm; and (iii) repeating steps (i) and (ii) for each portion of the algorithm until the diagnostic test is complete. Such a method may avoid any requirement to install a computer program defining an algorithm for a diagnostic test on the mobile electronic device. The present disclosure also relates to a system, a method and a computer program for use in performing a diagnostic test on a mobile electronic device and, in particular, though not exclusively for use in (Continued)

performing a diagnostic test on a mobile phone, a smart-phone, a tablet or a laptop.

23 Claims, 9 Drawing Sheets

(56) References Cited

U.S. PATENT DOCUMENTS

| | | | | |
|---|---|---|---|---|
| 9,652,364 | B1 * | 5/2017 | Kaila | G06F 11/366 |
| 10,255,156 | B2 * | 4/2019 | Frenz | H04N 7/183 |
| 2013/0198266 | A1 | 8/2013 | Kiley et al. | |
| 2016/0255495 | A1 * | 9/2016 | Huang | H04W 8/245 |
| | | | | 455/550.1 |
| 2022/0329634 | A1 * | 10/2022 | Al-Damluji | H04L 65/1104 |

FOREIGN PATENT DOCUMENTS

| | | |
|---|---|---|
| JP | 2003124866 | 4/2003 |
| JP | 2008146250 | 6/2008 |
| JP | 2015531502 | 11/2015 |
| JP | 2020042573 | 3/2020 |
| WO | 2004075048 | 9/2004 |
| WO | 2013088534 | 4/2015 |
| WO | 2020115354 | 6/2020 |

OTHER PUBLICATIONS

Notice of Reasons for Refusal (Japanese Office Action) issued Feb. 20, 2025 (Feb. 20, 2025) 21 pages (including English Translation), issued on related Japanese Patent Application 2023-512200 by the Japanese Patent Office.

Decision to Grant a Patent, dated May 26, 2025, 6 pages (including English translation), issued on related Japanese Patent Application 2023-512200, by the Japanese Patent Office.

* cited by examiner

```
{
  "TestSuite": {
    "3556320812243595BackCamera": {
      "show": {
        "displayscreen": "PreBackCamera"
      },
      "run": {
        "do": {
          "perform": "BackCameraPreview"
        },
        "cameratype": "custom",
        "verifyimage": true
      },
      "confirm": {
        "logic": "filesizegreaterthanzero",
        "showtestresult": true
      }
    }
  }
}
```

STREAMING METHOD AND SYSTEM FOR MOBILE ELECTRONIC DEVICE DIAGNOSTICS

CROSS REFERENCE TO RELATED APPLICATIONS

This application is a U.S. National Phase patent application of and claims priority to International Application No. PCT/EP2021/071279, filed Jul. 29, 2021, which claims priority to and the benefit of United Kingdom Patent Application No. 2012898.9, filed on Aug. 18, 2020, each of the foregoing applications being incorporated herein by reference.

FIELD

The present disclosure relates to a system, a method and a computer program for use in performing a diagnostic test on a mobile electronic device and, in particular, though not exclusively for use in performing a diagnostic test on a mobile phone, a smartphone, a tablet or a laptop.

BACKGROUND

It is known to perform a diagnostic test on a mobile electronic device by downloading and installing one or more computer programs defining one or more corresponding diagnostic tests on the mobile electronic device and storing the one or more computer programs in non-volatile memory of the mobile electronic device. In response to a later request to perform a diagnostic test on the mobile electronic device, a selected one of the one or more computer programs is executed on the mobile electronic device to cause the mobile electronic device to perform the corresponding diagnostic test. However, installing a computer program on the mobile electronic device may disrupt other operations performed by the mobile electronic device. In addition, storing a computer program in non-volatile memory of the mobile electronic device may take up space in non-volatile memory of the mobile electronic device. Furthermore, when wishing to add a new or customised diagnostic test, or when wishing to revise or improve an existing diagnostic test, such known methods require an update to the one or more computer programs to be downloaded, installed and stored in non-volatile memory of the mobile electronic device. This may further disrupt other operations performed by the mobile electronic device and/or take up further space in non-volatile memory of the mobile electronic device.

SUMMARY

According to an aspect of the present disclosure there is provided a method for use in performing a diagnostic test on a mobile electronic device, the diagnostic test defined by an algorithm which includes a plurality of portions, and the method comprising:

(i) transmitting, from a server to the mobile electronic device, data defining a portion of the algorithm;

(ii) executing, on the mobile electronic device, the portion of the algorithm; and (iii) repeating steps (i) and (ii) above for each portion of the algorithm until the diagnostic test is complete.

The algorithm may comprise a sequence of commands or instructions.

Such a method may avoid any requirement to install a computer program defining an algorithm for a diagnostic test on the mobile electronic device. Consequently, such a method may avoid any disruption of other operations performed by the mobile electronic device which may result when installing computer programs defining diagnostic tests.

Step (i) of the method may comprise transmitting, from the server to memory of the mobile electronic device, data defining the portion of the algorithm.

Step (i) of the method may comprise transmitting, from the server to volatile memory of the mobile electronic device, data defining the portion of the algorithm.

Such a method may also avoid any requirement to store the installed computer program defining the algorithm for the diagnostic test in non-volatile memory of the mobile electronic device and may therefore save space in non-volatile memory of the mobile electronic device compared with known diagnostic methods.

Such a method may enable new or customised diagnostic tests for the mobile electronic device to be stored in a database located remotely from the mobile electronic device and made available for execution by the mobile electronic device on demand without requiring the release or installation of an update to one or more computer programs stored in non-volatile memory of the mobile electronic device. Such a method may enable revised or improved diagnostic tests to be stored in the remote database and to be made available for execution by the mobile electronic device on demand without requiring the release or installation of an update to one or more computer programs stored in non-volatile memory of the mobile electronic device.

The method may comprise performing steps (i) and (ii) sequentially.

The method may comprise performing step (ii) in response to completion of step (i).

Steps (i) and (ii) may at least partially overlap.

The method may comprise executing, on the mobile electronic device, one portion of the algorithm whilst transmitting, from the server to the mobile electronic device, data defining one or more subsequent portions of the algorithm.

The method may comprise repeating step (i) automatically according to an internal or pre-set rule or schedule. The method may comprise repeating step (i) according to an internal or pre-set rule or schedule without any requirement for the server to wait until an associated request from the mobile electronic device is received.

The method may comprise:

temporarily storing the data received from the server defining a given portion of the algorithm in a volatile memory buffer of the mobile electronic device until a processing resource of the mobile electronic device is ready to execute the given portion of the algorithm; and then moving the data defining the given portion of the algorithm out of the volatile memory buffer of the mobile electronic device to the processing resource for execution.

The method may comprise only repeating step (i) when the volatile memory buffer of the mobile electronic device has sufficient space to store the data defining the next portion of the algorithm. The method may comprise repeating step (i) according to intervals that depend on the size and/or reservation of the volatile memory buffer of the mobile electronic device and/or the processing resource of the mobile electronic device. Consequently, such a method may avoid increasing reservation of the volatile memory buffer of the mobile electronic device.

Each portion of the algorithm may be defined by one or more commands or instructions.

Each command or instruction may be expressed in a higher-level computer language.

Step (i) of the method may comprise transmitting, from the server to the mobile electronic device, one or more commands or instructions defining the portion of the algorithm, wherein each command or instruction is expressed in a higher-level computer language.

Step (ii) of the method may comprise:

converting or translating the one or more higher-level computer language commands or instructions into one or more commands or instructions expressed in a lower-level computer language of the operating system (OS) of the mobile electronic device for execution by the OS of the mobile electronic device; and executing, on the mobile electronic device, the one or more lower-level computer language commands or instructions defining the portion of the algorithm.

The mobile electronic device may comprise a parsing application for converting or translating the one or more higher-level computer language commands or instructions into one or more commands or instructions expressed in the lower-level computer language of the operating system (OS) of the mobile electronic device for execution by the OS of the mobile electronic device. The parsing application may, for example, be installed on the mobile electronic device.

The higher-level computer language may comprise JavaScript Object Notation (JSON). The mobile electronic device may comprise a JSON parsing application. The JSON parsing application may, for example, be installed on the mobile electronic device.

Step (i) of the method may comprise transmitting, from the server to the mobile electronic device, the data defining the portion of the algorithm using a communication protocol such as Hypertext Transfer Protocol (HTTP) or Hypertext Transfer Protocol Secure (HTTPS).

The method may comprise establishing a data streaming connection between the mobile electronic device and the server, wherein the data streaming connection between the mobile electronic device and the server is configured to enable initiation of steps (i), (ii) and (iii) in response to receipt of a single data transmission initiation request at the server.

The method may comprise establishing the data streaming connection via a streaming service mediator. The streaming service mediator may be provided with the server.

The method may comprise executing a diagnostics application on the mobile electronic device to establish the data streaming connection between the mobile electronic device and the server.

Establishing the data streaming connection may comprise providing the server with a unique identifier for the mobile electronic device. For example, establishing the data streaming connection may comprise fetching the unique identifier for the mobile electronic device automatically without requiring the unique identifier for the mobile electronic device to be entered manually and providing the fetched unique identifier for the mobile electronic device to the server. Alternatively, establishing the data streaming connection may comprise manually entering the unique identifier for the mobile electronic device and providing the manually entered unique identifier for the mobile electronic device to the server. The unique identifier for the mobile electronic device may comprise the International Mobile Equipment Identity (IMEI) of the mobile electronic device.

The diagnostic test may be selected from a plurality of diagnostic tests stored in a database, each diagnostic test being defined by a corresponding algorithm.

The method may comprise selecting the diagnostic test from a plurality of diagnostic tests stored in a database.

The method may comprise using a web browser to allow a user to select the diagnostic test from a plurality of diagnostic tests stored in the database and displayed in a webstore accessible via the web browser.

The method may comprise using a web browser of the mobile electronic device to allow a user of the mobile electronic device to select the diagnostic test from a plurality of diagnostic tests stored in the database and displayed in a webstore accessible via the web browser.

When executed by the mobile electronic device, the diagnostics application may start, or direct a user of the mobile electronic device to start, the web browser of the mobile electronic device to allow the user of the mobile electronic device to select the diagnostic test from a plurality of diagnostic tests stored in the database and displayed in a webstore accessible via the web browser of the mobile electronic device.

The method may comprise using a web browser of a remote computing resource directly or indirectly in communication with, and located remotely from, the mobile electronic device to allow a user of the remote computing resource to select the diagnostic test from a plurality of diagnostic tests stored in the database and displayed in a webstore accessible via the web browser of the remote computing resource. The remote computing resource may, for example, be a computer or a laptop. The remote computing resource may, for example, be operated by a call centre agent.

The method may comprise transmitting a data transmission initiation request from the webstore to the server in response to selection of the diagnostic test via the web browser.

The data transmission initiation request may comprise the unique identifier for the mobile electronic device.

The data transmission initiation request may comprise information which uniquely identifies the selected diagnostic test.

The method may comprise initiating steps (i), (ii) and (iii) in response to receipt of the data transmission initiation request at the server.

Receiving the single data transmission initiation request at the server may comprise receiving the single data transmission initiation request at an Application Programming Interface (API) of the server.

The API of the server may be configured to transmit the data defining the plurality of portions of the algorithm to the mobile electronic device in response to the single data transmission initiation request received at the API of the server without any requirement for the mobile electronic device to transmit any further or additional data transmission requests from the mobile electronic device to the API of the server for initiating separately the transmission of data defining each portion of the algorithm from the API of the server to the mobile electronic device.

The method may comprise transmitting the data defining the plurality of portions of the algorithm as a single stream of data.

The single stream of data may comprise payload data and metadata.

The single stream of data may comprise a plurality of responses from the API of the server.

The single stream of data may comprise a first response from the API of the server consisting solely of metadata indicating that a data stream has been initiated, a final response from the API of the server consisting solely of metadata indicating that the data stream has ended, and one or more intervening responses from the API of the server between the first response and the final response, wherein the one or more intervening responses consist solely of payload data.

The single stream of data may comprise a plurality of responses from the API of the server, wherein each response from the API of the server includes a header portion and a payload portion having payload data, wherein the header of the first response from the API of the server includes a Start of Stream (SOS) signal, and wherein the header of the final response from the API of the server includes an End of Stream (EOS) signal.

The method may comprise displaying one or more results generated by the diagnostic test on the mobile electronic device.

The method may comprise transmitting one or more results generated by the diagnostic test to the server and/or to a remote computing resource.

The diagnostic test may relate to a functional aspect of the mobile electronic device.

The diagnostic test may relate to the ability of the mobile electronic device to communicate with one or more peripheral devices or one or more remote devices over a communications network.

The diagnostic test may relate to wireless network connectivity, to the strength of a signal associated with a wireless network and/or to wireless network communications.

The diagnostic test may relate to charging of the mobile electronic device and/or to power consumption of the mobile electronic device.

The diagnostic test may relate to the operation of a hardware element of the mobile electronic device.

The diagnostic test may relate to the operation of a battery of the mobile electronic device.

The diagnostic test may relate to the operation of a memory of the mobile electronic device.

The diagnostic test may relate to the operation of a SIM card of the mobile electronic device.

The diagnostic test may relate to the operation of a memory card such as an SD card of the mobile electronic device.

The diagnostic test may relate to the operation of one or more controls of the mobile electronic device such as one or more of a button, a key, a keyboard, a keypad, a user interface, and a touchscreen of the mobile electronic device.

The diagnostic test may relate to the operation of one or more sensors of the mobile electronic device such as one or more of an accelerometer, an image sensor, a camera, a fingerprint sensor and a microphone of the mobile electronic device.

The diagnostic test may relate to the operation of one or more indicators of the mobile electronic device such as one or more of a display, a user interface, a touchscreen and a speaker of the mobile electronic device.

The mobile electronic device may comprise a mobile phone, a smartphone, a tablet or a laptop.

According to an aspect of the present disclosure there is provided a computer program for use in performing a diagnostic test on a mobile electronic device, which computer program, when executed by a processing resource, causes the processing resource to establish a data streaming connection between the mobile electronic device and a server to enable the initiation of a method for use in performing a diagnostic test on the mobile electronic device, the diagnostic test defined by an algorithm which includes a plurality of portions, and the method comprising:

(i) transmitting, from the server to the mobile electronic device, data defining a portion of the algorithm;

(ii) executing, on the mobile electronic device, the portion of the algorithm; and (iii) repeating steps (i) and (ii) above for each portion of the algorithm until the diagnostic test is complete.

The algorithm may comprise a sequence of commands or instructions.

Step (i) of the method may comprise transmitting, from the server to memory of the mobile electronic device, data defining the portion of the algorithm.

Step (i) of the method may comprise transmitting, from the server to volatile memory of the mobile electronic device, data defining the portion of the algorithm. Once the computer program has established the data streaming connection between the mobile electronic device and the server, the computer program may start, or direct a user of the mobile electronic device to start, a web browser to allow the user to select the diagnostic test from a plurality of diagnostic tests stored in a database.

The computer program may comprise a diagnostics application which is provided on the mobile electronic device. The processing resource may be provided with the mobile electronic device. The user may comprise a user of the mobile electronic device.

According to an aspect of the present disclosure there is provided a method for use in performing a diagnostic test on a mobile electronic device, the diagnostic test defined by an algorithm, and the method comprising:

(i) transmitting, from a server to volatile memory of the mobile electronic device, data defining the algorithm; and (ii) executing the algorithm on the mobile electronic device.

The algorithm may comprise a sequence of commands or instructions.

The method may comprise performing steps (i) and (ii) sequentially.

The method may comprise performing step (ii) in response to completion of step (i).

Steps (i) and (ii) may at least partially overlap.

The diagnostic test may be defined by an algorithm that includes a plurality of portions, and the method may comprise:

(a) transmitting, from the server to the volatile memory of the mobile electronic device, data defining a portion of the algorithm;

(b) executing, on the mobile electronic device, the portion of the algorithm; and (c) repeating steps (a) and (b) above for each portion of the algorithm until the diagnostic test is complete.

It should be understood that any one or more of the features of any one of the preceding aspects of the present disclosure may be combined with any one or more of the features of any of the other aspects of the present disclosure.

BRIEF DESCRIPTION OF THE DRAWINGS

A system, a method and a system for use in performing a diagnostic test on a mobile electronic device will now be described by way of non-limiting example only with reference to the following drawings of which:

FIG. 9 is an algorithm defining a BackCamera diagnostic test for the mobile electronic device of FIG. 1 expressed in the JavaScript Object Notation (JSON) format;

DETAILED DESCRIPTION OF THE DRAWINGS

Figure 1:
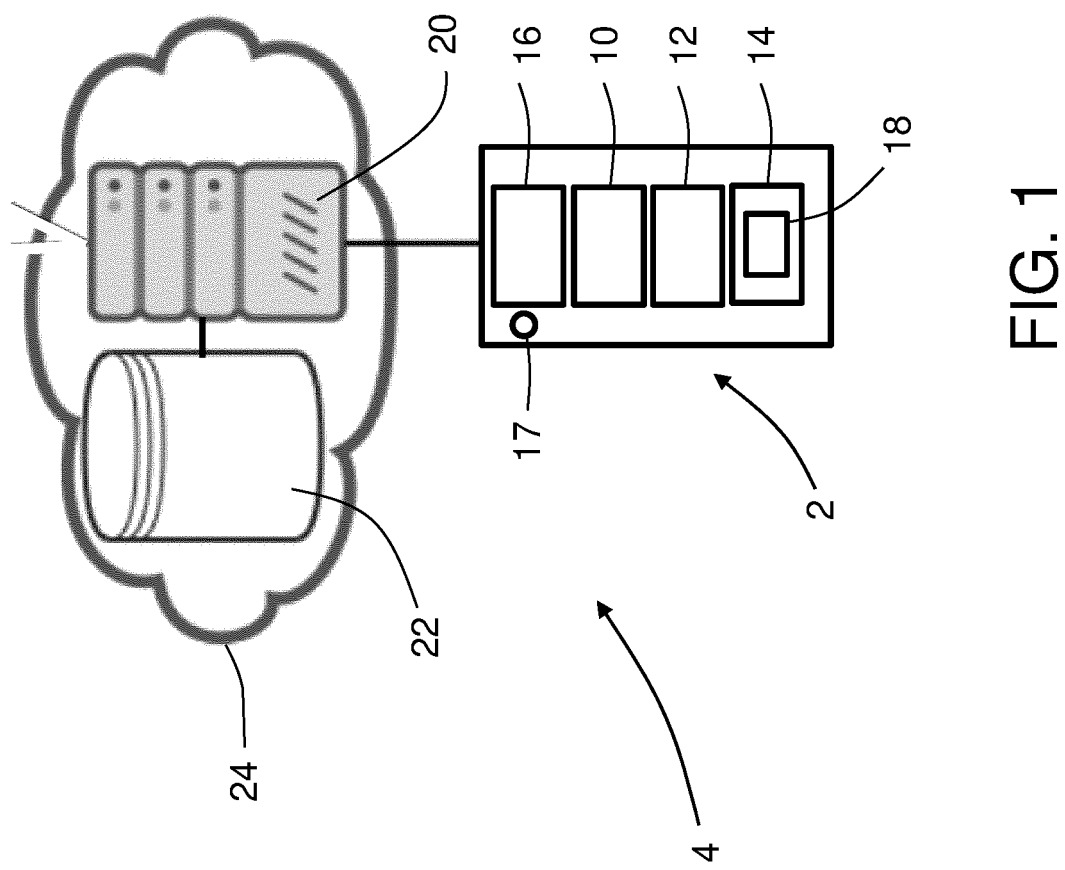
FIG. 1 is a schematic of a mobile electronic device and a system for use in performing a diagnostic test on the mobile electronic device.

Referring initially to FIG. 1, there is shown a mobile electronic device generally designated 2 and a system generally designated 4 for use in performing a diagnostic test on the mobile electronic device 2.

The mobile electronic device 2 may be a mobile phone, a smartphone, a tablet or a laptop or the like. The mobile electronic device 2 includes a processing resource 10, volatile memory 12, non-volatile memory 14, a touchscreen 16 and a back camera 17. The non-volatile memory 14 stores a diagnostic application 18.

The system 4 includes a server 20 and a database 22 in the cloud 24. The server 20 is configured for communication with the database 22 and the mobile electronic device 2 via the cloud 24.

In use, a user of the mobile electronic device 2 runs the diagnostic application 18 via the touchscreen 16 to establish a data streaming connection between the mobile electronic device 2 and the server 20. As will be described in more detail below, the data streaming connection is configured to enable initiation of a method for use in performing a diagnostic test on the mobile electronic device 2 in response to receipt of a single data transmission initiation request at the server 20.

Figure 3:
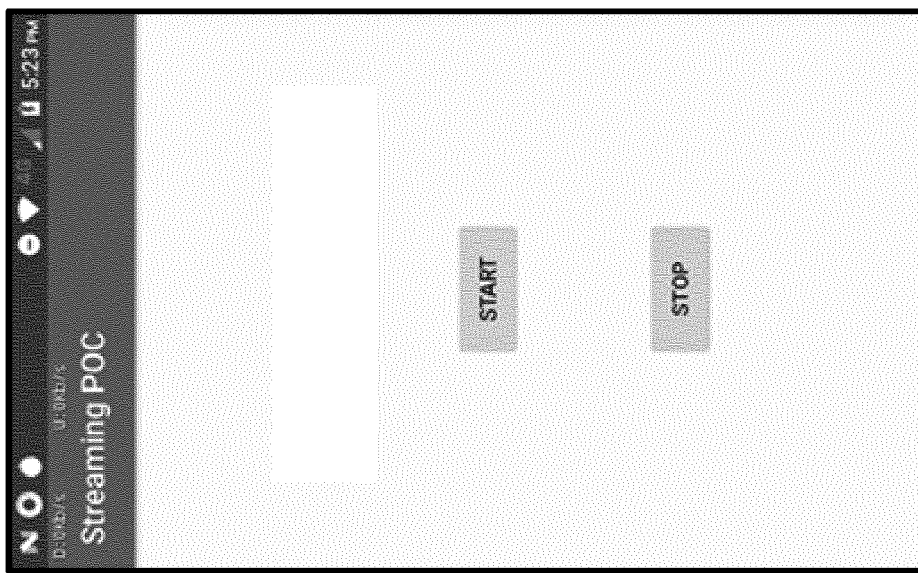
FIG. 3 is a screenshot of the mobile electronic device of FIG. 1 displaying a user interface which is configured to allow a user of the mobile electronic device to identify the mobile electronic device of FIG. 1 to a streaming service mediator of a server of the system of FIG. 1.
Figure 2:
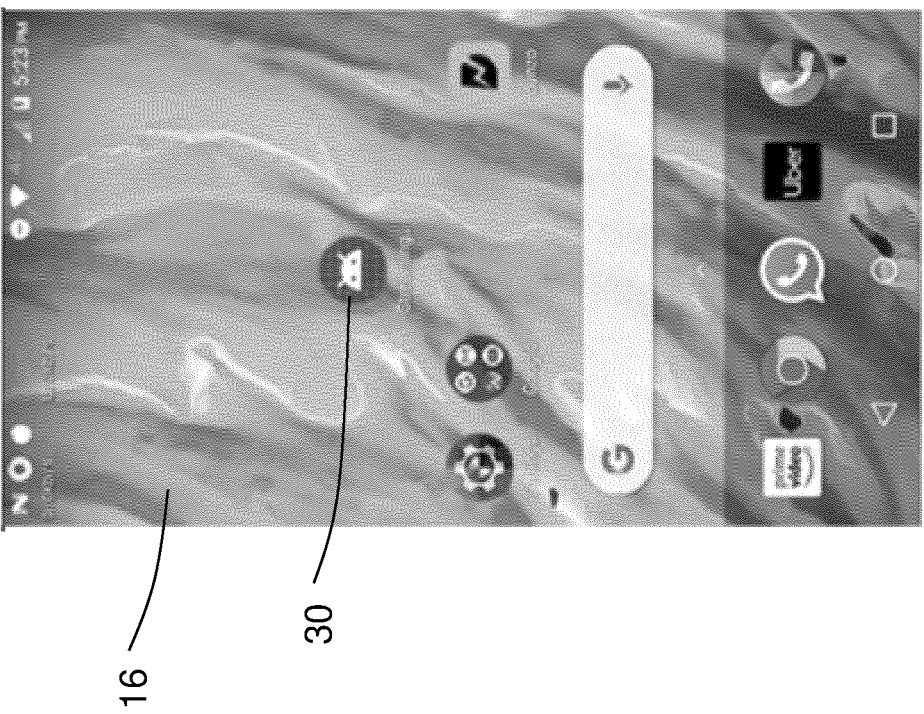
FIG. 2 is a screenshot of the mobile electronic device of FIG. 1 displaying an icon for a diagnostic application.

With reference to FIG. 2, the method begins with the user of the mobile electronic device 2 running the diagnostic application 18 by touching the "Streaming" icon 30 displayed on the touchscreen 16 of the mobile electronic device 2. Running the diagnostic application 18 enables a data streaming connection to be established whereby the mobile electronic device 2 can accept a stream of data defining a diagnostic algorithm in the form of a stream of diagnostic commands in the JavaScript Object Notation (JSON) format from the database 22 via the server 20. Since the data streaming connection cannot be established synchronously, the data streaming connection is established via a streaming service mediator provided with the server 20. Specifically, as shown in FIG. 3, the touchscreen 16 displays a user interface which includes a start button for commencing streaming. On activation of the start button, the diagnostic application 18 automatically fetches a unique identifier for the mobile electronic device 2 in the form of the International Mobile Equipment Identity (IMEI) of the mobile electronic device 2 and provides the unique identifier to the server to thereby register the mobile electronic device 2 with the streaming service mediator of the server 20.

Figure 4:
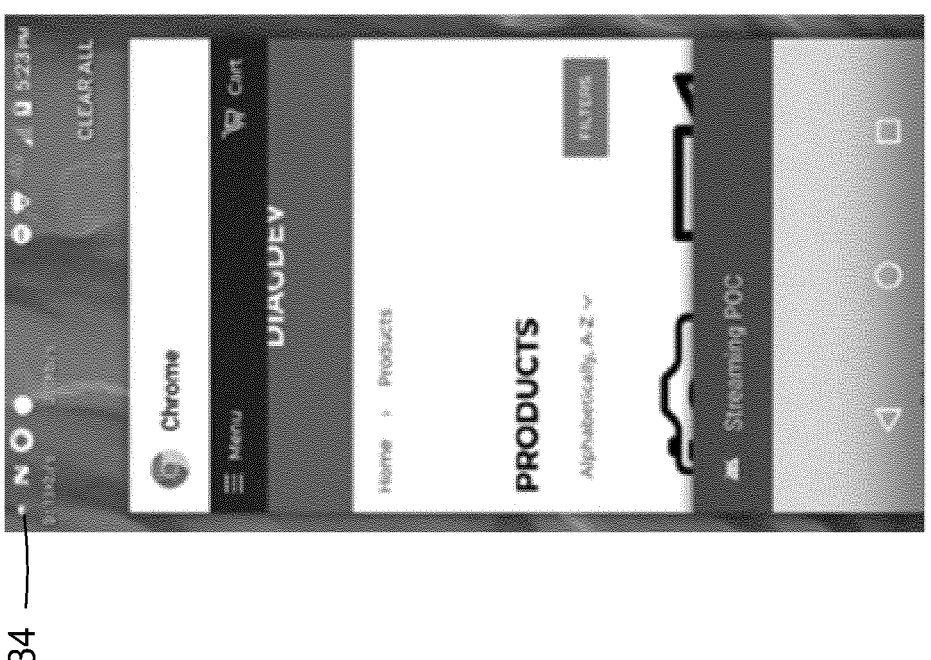
FIG. 4 is a screenshot of the mobile electronic device of FIG. 1 illustrating that a streaming connection has been established with a streaming service mediator of a server of the system of FIG. 1.

As shown in FIG. 4, the user closes the user interface of the diagnostic application 18 without terminating diagnostic application 18 and the mobile electronic device 2 waits for the matching to happen with the server 20 as indicated by the small notification icon 34 present in the notification bar at the top of the touchscreen 16. Although not shown in FIG. 4, this may be confirmed by opening the notification bar and checking that a title "Streaming Diagnostics" is visible together with a status of "Awaiting Command".

Figure 5:
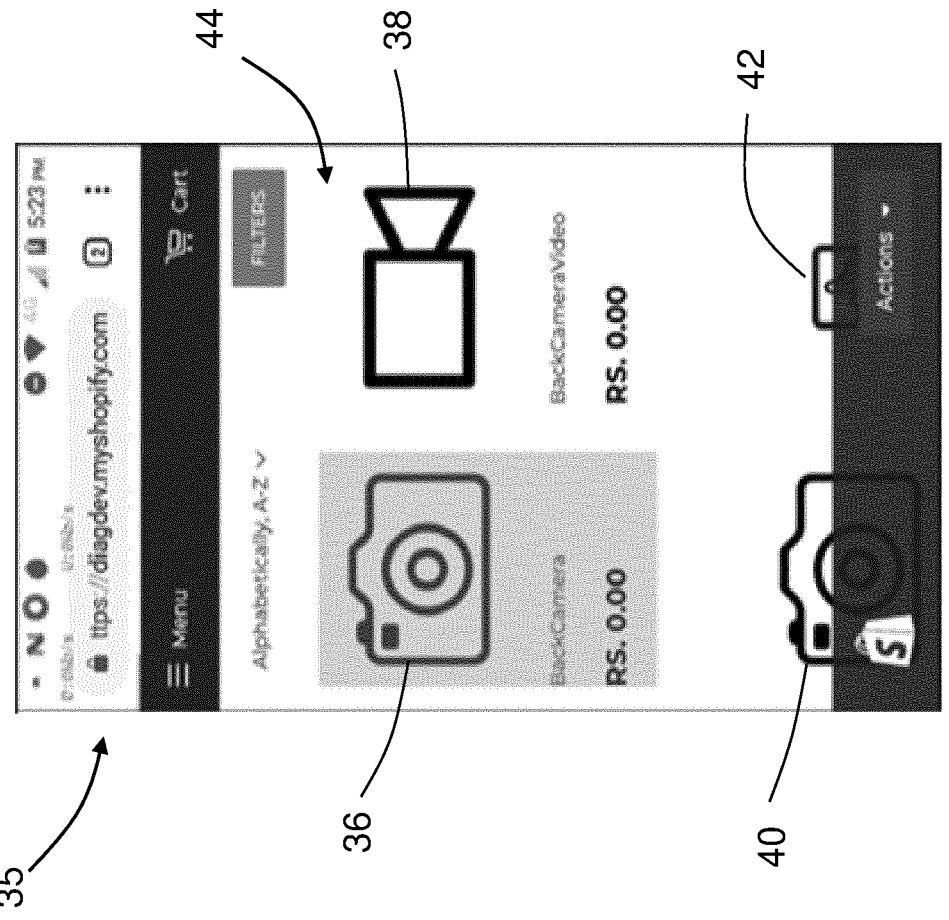
FIG. 5 is a screenshot of a web browser of the mobile electronic device of FIG. 1 displaying a web store to allow a user of the mobile electronic device to select and/or purchase a diagnostic test for the mobile electronic device.

The user of the mobile electronic device 2 may subsequently visit a webstore via a web browser 35 of the mobile electronic device 2 as shown in FIG. 5 and select a desired diagnostic test from a plurality of diagnostic tests by selecting one of the diagnostic test icons 36, 38, 40, 42 via a webstore user interface 44. For example, as shown in FIG. 5, the user selects the icon 36 corresponding to the "Back-Camera" diagnostic test. The webstore is also registered with the streaming service mediator of the server 20.

Figure 7:
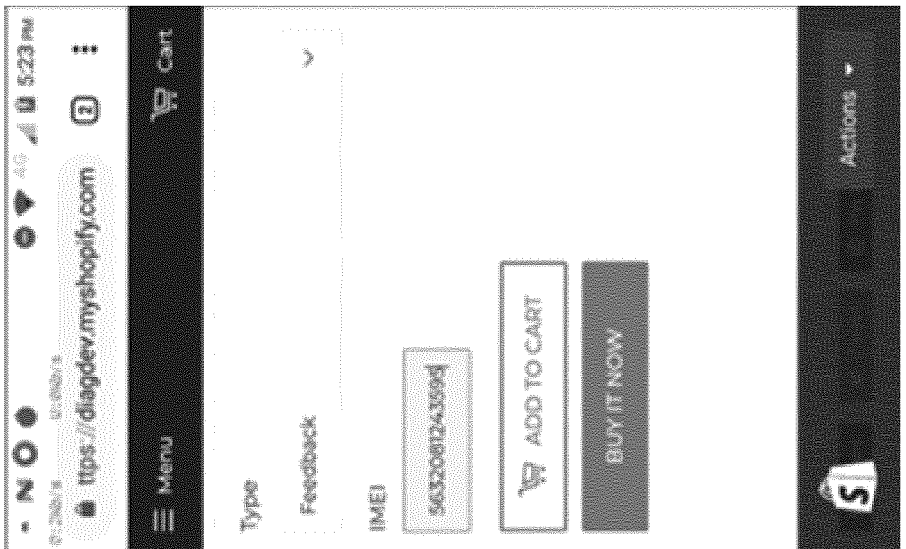
FIG. 7 is a second screenshot of a webstore user interface to allow a user of the mobile electronic device of FIG. 1 to select a diagnostic test for the mobile electronic device.
Figure 6:
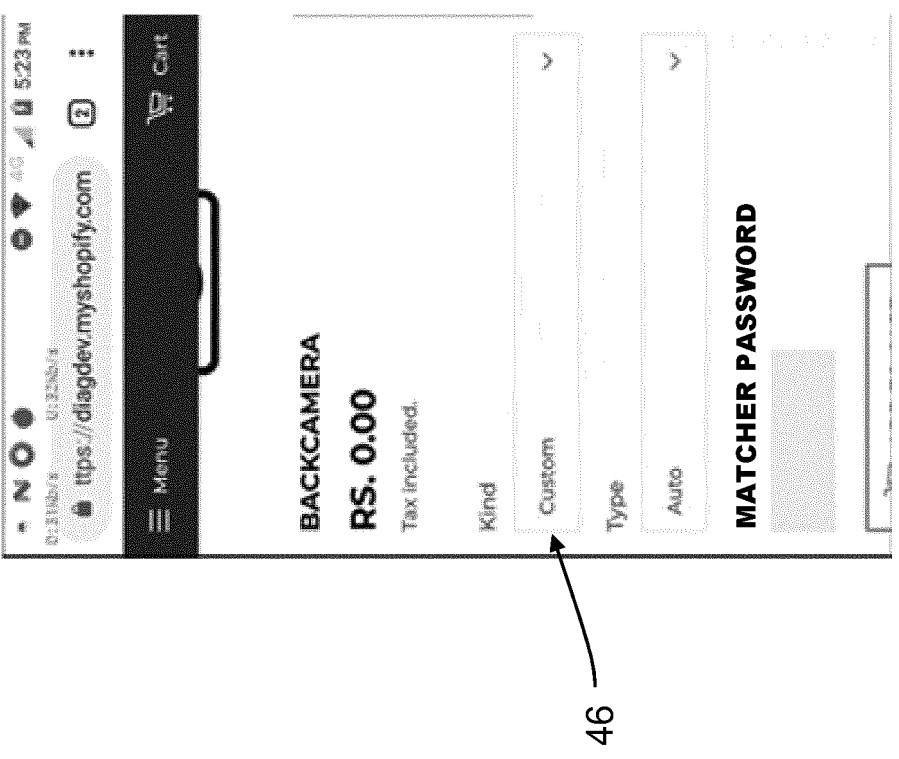
FIG. 6 is a first screenshot of a webstore user interface to allow a user of the mobile electronic device of FIG. 1 to select a diagnostic test for the mobile electronic device.

Once the user selects a diagnostic test, the user is presented with a diagnostic test settings or options user interface to allow the user to customise some properties of the selected diagnostic test. For example, once the user selects the "BackCamera" diagnostic test as shown in FIG. 5, the user is presented with a "BackCamera" diagnostic test settings or options user interface 46 shown in FIG. 6 to allow the user to customise some properties of the BackCamera diagnostic test before purchasing it. For example, the user may select between a "Type" of "Auto" or "Feedback". If a Type of "Auto" is selected, the BackCamera diagnostic test checks the file size of the image which is captured. If a Type of "Feedback" is selected, the BackCamera diagnostic test asks the user if the image captured from the camera was clear or not as will be described in more detail below. Other options may include "shoot video/photo", "enable flash light" and the like. In addition, as shown in FIG. 7, the user is also required to enter the IMEI of the mobile electronic device 2 to identify the mobile electronic device 2 to the webstore so that the webstore knows that it should stream the data defining the algorithm for the selected diagnostic test to the mobile electronic device 2 via the streaming service mediator of the server 20.

Figures 8, 10:
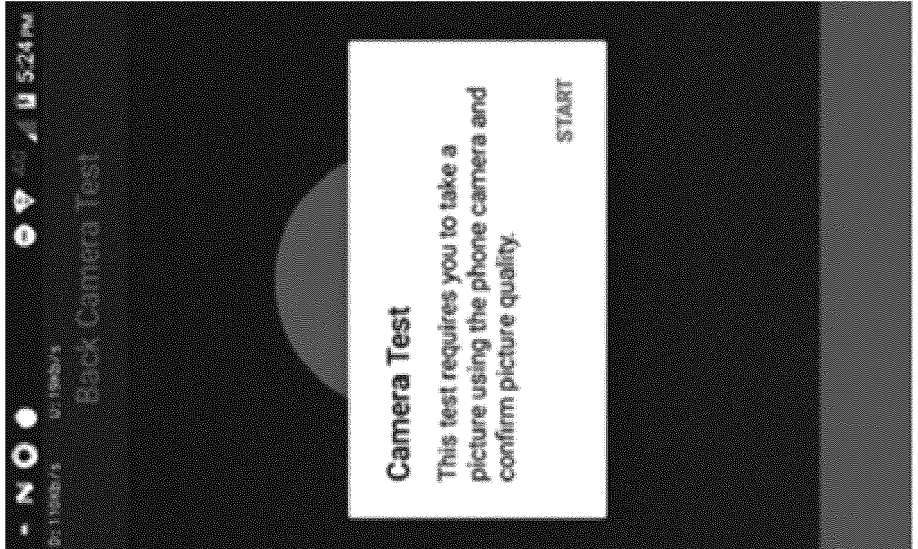
FIG. 8 is a third screenshot of a webstore user interface to allow a user of the mobile electronic device of FIG. 1 to select a diagnostic test for the mobile electronic device.
FIG. 10 is a screenshot of the mobile electronic device of FIG. 1 illustrating a first step of the BackCamera diagnostic test.

Once the user selects "Buy it now", the user is presented with the user interface shown in FIG. 8 to allow the user to enter his/her Contact information and a Billing address. Once the user has entered his/her Contact information and Billing address and completed the purchase process, the webstore transmits a data transmission initiation request to the streaming service mediator of the server 20, wherein the data transmission initiation request includes the IMEI of the mobile electronic device 2 and information which uniquely identifies the selected diagnostic test. Upon receipt of the data transmission initiation request, an API of the server 20 initiates streaming of data to the volatile memory 12 of the mobile electronic device 2, which data defines the algorithm which defines the selected BackCamera diagnostic test. Specifically, the selected BackCamera diagnostic test is defined by an algorithm which includes a plurality of portions, with each portion defined by data which includes one or more higher-level computer language commands in the form of one or more JSON commands. The data including the JSON commands which define the algorithm for the BackCamera diagnostic test is shown in FIG. 9. Upon receipt of the data transmission initiation request, the API of the server 20 transmits to a buffer of the volatile memory 12 of the mobile electronic device 2, data which defines a first portion of the algorithm for the BackCamera diagnostic test. Specifically, upon receipt of the data transmission initiation request, the API of the server 20 transmits to the buffer of the volatile memory 12 of the mobile electronic device 2, one or more of the JSON commands defining the first portion of the algorithm for the BackCamera diagnostic test. Upon receipt by the buffer of the volatile memory 12 of the JSON commands defining the first portion of the algorithm for the BackCamera diagnostic test, the JSON commands defining the first portion of the algorithm for the BackCamera diagnostic test are transferred from the buffer of the volatile memory 12 to the processing resource 10 of the mobile electronic device 2 for execution. The processing resource 10 converts or translates the one or more JSON commands defining the first portion of the algorithm for the BackCamera diagnostic test into one or more commands or instructions expressed in a lower-level computer language of the operating system (OS) of the mobile electronic device 2 for execution by the OS of the mobile electronic device 2.

Provided the buffer of the volatile memory 12 has sufficient space, the API of the server 20 repeatedly transmits to the mobile electronic device 2, one or more of the JSON commands defining one or more subsequent portions of the algorithm for the BackCamera diagnostic test to the buffer of the volatile memory 12 of the mobile electronic device 2, portion-by-portion until the buffer of the volatile memory 12 is full or all of the portions of the algorithm for the BackCamera diagnostic test have been transmitted to the buffer of the volatile memory 12 of the mobile electronic device 2. The JSON commands defining each subsequent portion of the algorithm for the BackCamera diagnostic test are transferred sequentially from the buffer of the volatile memory 12 to the processing resource 10 of the mobile electronic device 2 for execution until the diagnostic test is complete.

One of ordinary skill in the art will understand that the API of the server 20 transmits the data defining the plurality of portions of the algorithm as a single stream of data in response to the data transmission initiation request. The single stream of data includes a first response from the API of the server 20 consisting solely of metadata indicating that a data stream has been initiated, a final response from the API of the server 20 consisting solely of metadata indicating that the data stream has ended, and one or more intervening responses from the API of the server 20 between the first response and the final response, wherein the one or more intervening responses consist solely of payload data which defines the different portions of the algorithm defining the BackCamera diagnostic test.

Figure 12:
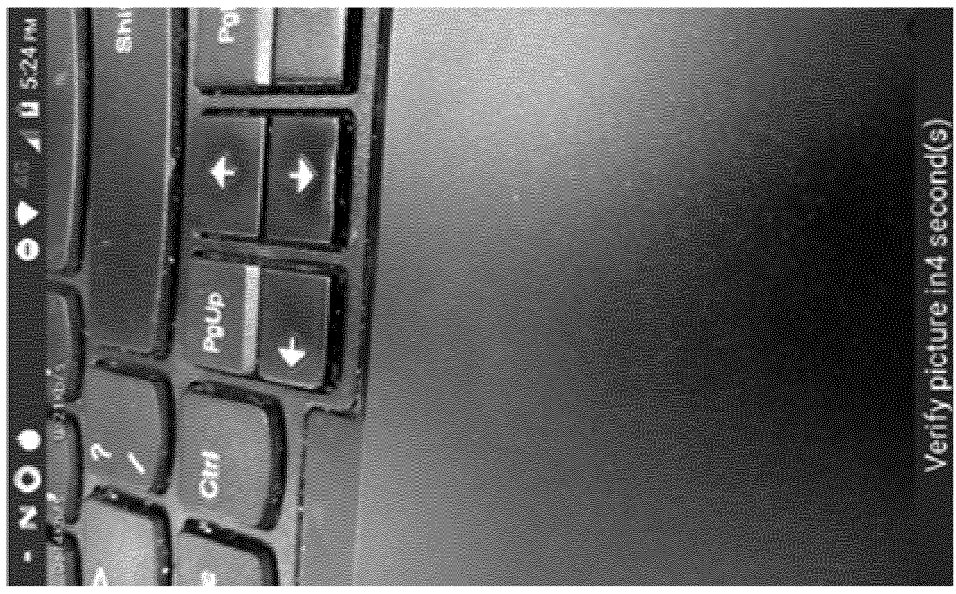
FIG. 12 is a screenshot of the mobile electronic device of FIG. 1 illustrating a third step of the BackCamera diagnostic test.
Figure 11:
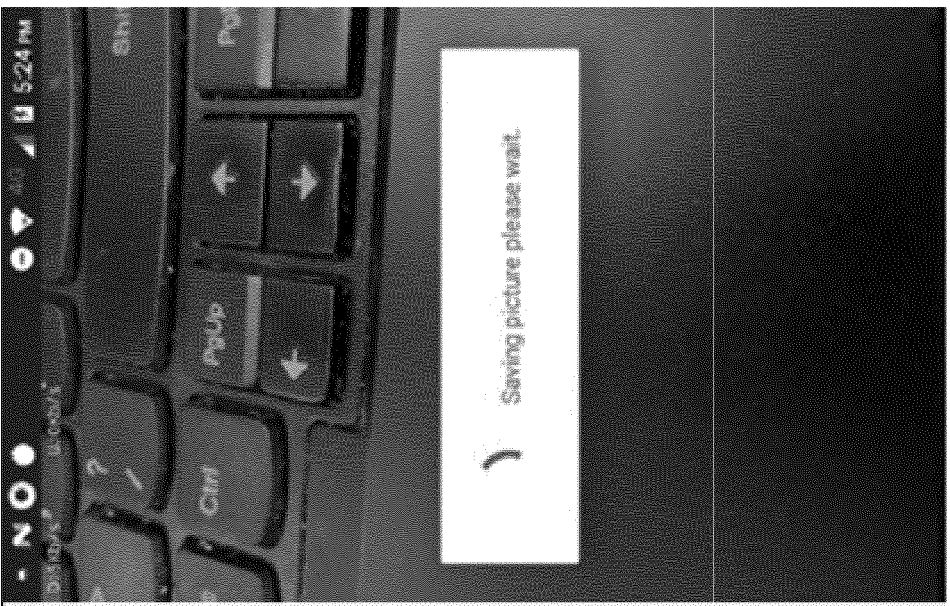
FIG. 11 is a screenshot of the mobile electronic device of FIG. 1 illustrating a second step of the BackCamera diagnostic test.
Figure 14:
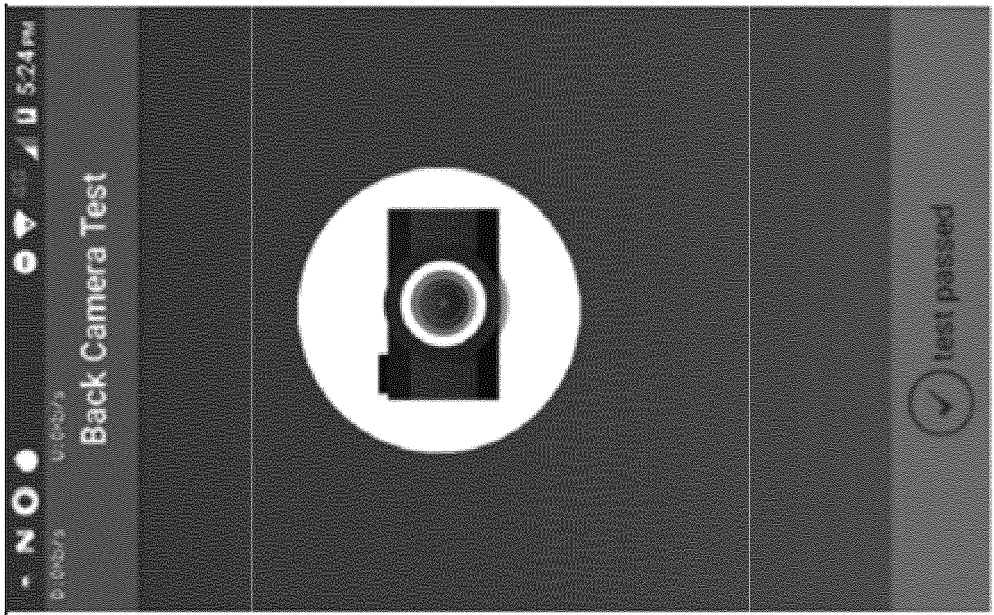
FIG. 14 is a screenshot of the mobile electronic device of FIG. 1 illustrating a fifth step of the BackCamera diagnostic test.
Figure 13:
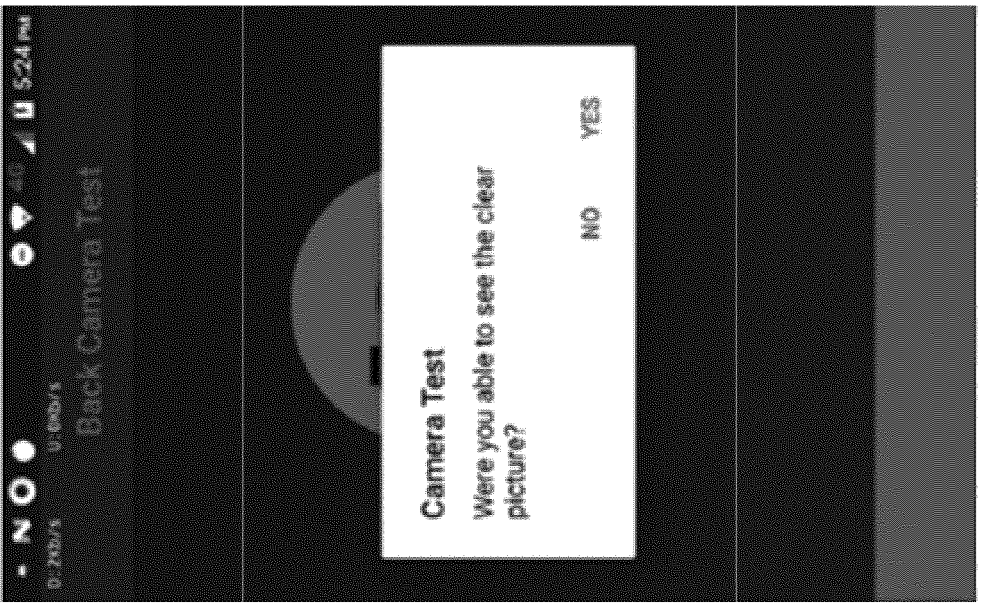
FIG. 13 is a screenshot of the mobile electronic device of FIG. 1 illustrating a fourth step of the BackCamera diagnostic test.

Execution of the JSON commands defining the algorithm for the BackCamera diagnostic test result in the mobile electronic device 2 performing the BackCamera diagnostic test as illustrated by the screenshots of the touchscreen 16 of the mobile electronic device 2 shown in FIGS. 10-14. The BackCamera diagnostic test begins with the user of the mobile electronic device 2 being prompted to start the diagnostic test as shown in FIG. 10. After selecting start, the BackCamera diagnostic test starts the back camera 17 of the mobile electronic device 2 and automatically takes a picture, which is stored into the non-volatile memory 14 of the mobile electronic device 2 as shown in FIG. 11. The user of the mobile electronic device 2 is then allowed a predetermined time period to visually inspect the picture as shown in FIG. 12. If the user originally selected the "Feedback" option when customising the diagnostic test, the user is then asked whether the picture was acceptable as shown in FIG. 13. If the user confirms that he/she could see the picture clearly, a test result is generated and displayed to the user via the touchscreen 16 of the mobile electronic device 2 as shown in FIG. 14. The mobile electronic device 2 also transmits the test result to the server for storing.

Figure 15:
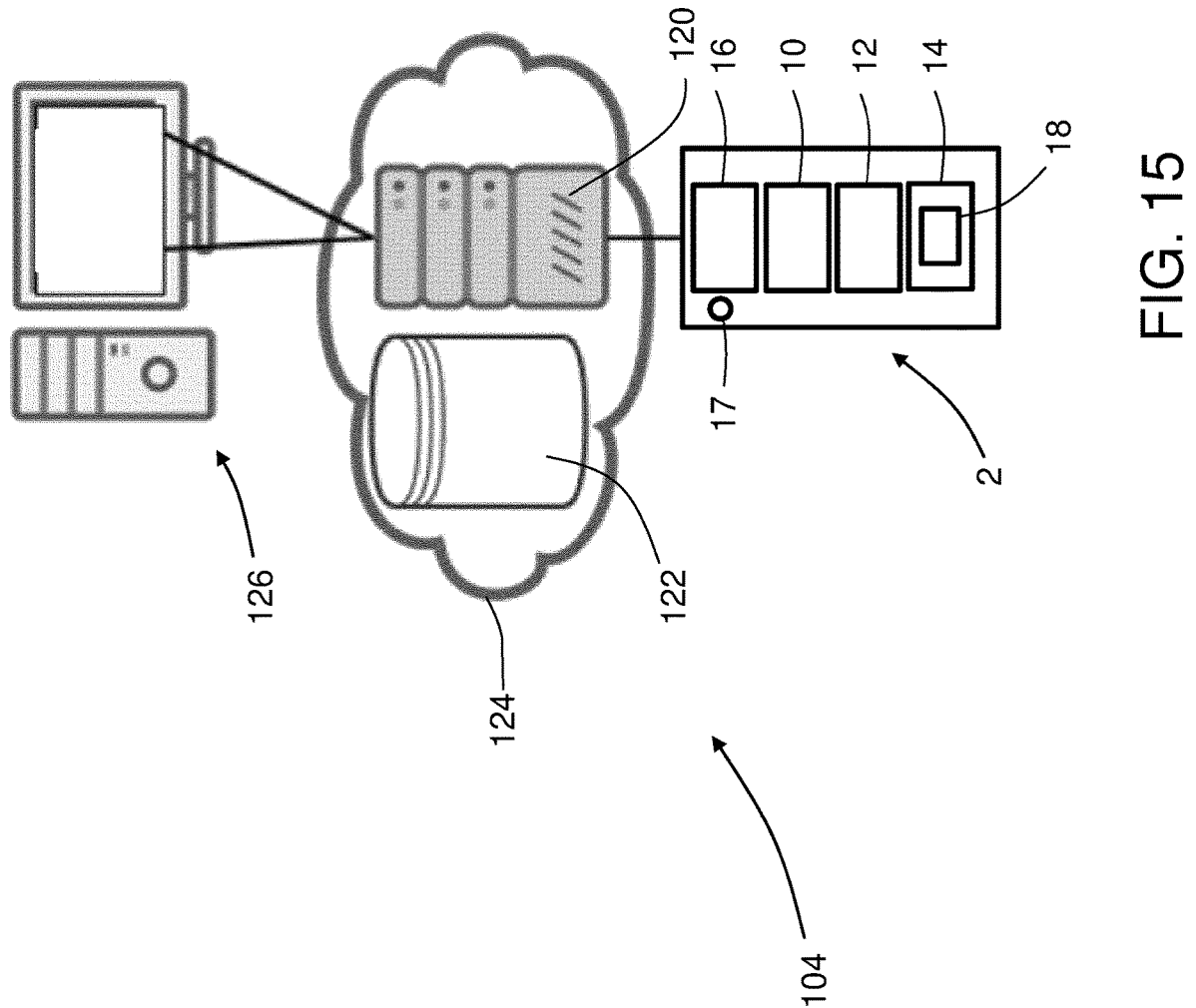
FIG. 15 is a schematic of the mobile electronic device of FIG. 1 and an alternative system for use in performing a diagnostic test on the mobile electronic device.

Referring to FIG. 15, there is shown the mobile electronic device generally designated 2 and an alternative system generally designated 104 for use in performing a diagnostic test on the mobile electronic device 2.

The alternative system 104 of FIG. 15 shares many like features with the system 4 of FIG. 1 with like features of the alternative system 104 of FIG. 15 being identified with the same reference numerals as the corresponding features of the system 4 of FIG. 1 incremented by "100". Specifically, the alternative system 104 includes a server 120 and a database 122 in the cloud 124, and a computing resource 126 which is indirectly in communication with, and located remotely from, the mobile electronic device 2 and configured for communication with the server 120. The server 120 is configured for communication with the database 122 and the mobile electronic device 2 via the cloud 124.

The alternative system 104 of FIG. 15 enables an alternative method of performing a diagnostic test on the mobile electronic device 2, wherein a user of the mobile electronic device 2 calls a call centre complaining that the mobile electronic device 2 needs diagnostics. A call centre agent requests that the user of the mobile electronic device 2 installs the diagnostics application 18 in the non-volatile memory 14 of the mobile electronic device 2. Once installed, the user of the mobile electronic device 2 runs the diagnostic application 18 via the touchscreen 16 to register the mobile electronic device 2 with a streaming service mediator of the server 120 to thereby establish a data streaming connection between the mobile electronic device 2 and the server 120 in essentially the same way as previously described with reference to FIGS. 2-4. Once the data streaming connection between the mobile electronic device 2 and the server 120 has been established, the call agent may select a diagnostic test from a plurality of diagnostic tests accessible via a webstore accessed via a web browser of the remote computing resource 126. The call agent also asks the user of the mobile electronic device 2 to provide the IMEI of the mobile electronic device 2 and then enters the IMEI of the mobile electronic device 2 via the web browser of the remote computing resource 126 to identify the mobile electronic device 2 to the webstore so that the webstore knows that it should stream the data defining the algorithm for the selected diagnostic test to the mobile electronic device 2 via the streaming service mediator of the server 120. The webstore then sends a single data transmission initiation request to the server 120 in response to selection of a diagnostic test and the server 120 streams the data defining the algorithm of the selected diagnostic test from the webstore to the mobile electronic device 2 in response to receipt of the single data transmission initiation request at the server 120 for execution by the mobile electronic device 2. This results in the by the mobile electronic device 2 performing the diagnostic test in essentially the same way described above with reference to the screen shots of the mobile electronic device 2 of FIGS. 10-14. At the end of the diagnostic test, the mobile electronic device 2 transmits the test results to the remote computing resource 126 via the server 120 so that the call centre agent may service the user of the mobile electronic device 2.

One of ordinary skill in the art will understand that various modifications are possible to the systems and methods described above. For example, rather than using the International Mobile Equipment Identity (IMEI) of the mobile electronic device 2 as a unique identifier for the mobile electronic device 2, an alternative unique identifier may be provided for the mobile electronic device 2.

A separate diagnostic test may be provided for any functional aspect of the mobile electronic device 2. For example, the diagnostic test may relate to the ability of the mobile electronic device 2 to communicate with one or more peripheral devices or one or more remote devices over a communications network. The diagnostic test may relate to wireless network connectivity, to the strength of a signal associated with a wireless network, and/or to wireless network communications. The diagnostic test may relate to charging of the mobile electronic device, power consumption of the mobile electronic device and/or to the operation of a battery of the mobile electronic device.

A separate diagnostic test may be provided for each hardware element of the mobile electronic device 2 and a corresponding icon may be displayed in the webstore user interface 44. For example a separate diagnostic test may be provided and a corresponding icon displayed in the webstore user interface 44 relating to the operation of one or more of the following hardware elements of the mobile electronic device 2: a battery; a memory; a SIM card; a memory card such as an SD card; a control of the mobile electronic device 2 such as a button, a key, a keyboard, a keypad, a user interface, and a touchscreen; a sensor such as an accelerometer, an image sensor, a camera, a fingerprint sensor or a microphone; an indicator such as a display, a user interface, a touchscreen or a speaker.

The single stream of data may comprise a plurality of responses from the API of the server 20, 120, wherein each response from the API of the server 20, 120 includes a header portion and a payload portion having payload data, wherein the header of the first response from the API of the server 20, 120 includes a Start of Stream (SOS) signal, and wherein the header of the final response from the API of the server 20, 120 includes an End of Stream (EOS) signal.

One of ordinary skill in the art will understand that one or more of the features of the embodiments of the present disclosure described above with reference to the drawings may produce effects or provide advantages when used in isolation from one or more of the other features of the embodiments of the present disclosure and that different combinations of the features are possible other than the specific combinations of the features of the embodiments of the present disclosure described above.

The invention claimed is:

1. A method for use in performing a diagnostic test on a mobile electronic device, the diagnostic test defined by an algorithm which includes a plurality of portions, and the method comprising:

(i) transmitting, from a server to the mobile electronic device, data defining a portion of the algorithm;

(ii) temporarily storing the data received from the server defining a given portion of the algorithm in a volatile memory buffer of the mobile electronic device until a processing resource of the mobile electronic device is ready to execute the given portion of the algorithm;

(iii) moving the data defining the given portion of the algorithm out of the volatile memory buffer of the mobile electronic device to the processing resource for execution;

(iv) executing, on the mobile electronic device, the portion of the algorithm; and (v) repeating steps (i)-(iv) above for each portion of the algorithm until the diagnostic test is complete.

2. A method as claimed in claim 1, comprising transmitting, from the server to memory, for example volatile memory, of the mobile electronic device, the data defining the portion of the algorithm.

3. A method as claimed in claim 1, wherein steps (i)-(iv) at least partially overlap.

4. A method as claimed in claim 1, comprising only repeating step (i) when the volatile memory buffer of the mobile electronic device has sufficient space to store the data defining the next portion of the algorithm.

5. A method as claimed in claim 1, wherein each portion of the algorithm comprises one or more commands or instructions.

6. A method as claimed in claim 5, wherein:

step (i) of the method comprises transmitting, from the server to the mobile electronic device, one or more commands or instructions defining the portion of the algorithm, wherein each command or instruction is expressed in a higher-level computer language; and step (iv) of the method comprises:

converting or translating the one or more higher-level computer language commands or instructions into one or more commands or instructions expressed in a lower-level computer language of the operating system (OS) of the mobile electronic device for execution by the OS of the mobile electronic device; and executing, on the mobile electronic device, the one or more lower-level computer language commands or instructions defining the portion of the algorithm.

7. A method as claimed in claim 6, wherein the higher-level computer language comprises JavaScript Object Notation (JSON).

8. A method as claimed in claim 1, comprising establishing a data streaming connection between the mobile electronic device and the server, wherein the data streaming connection between the mobile electronic device and the server is configured to enable initiation of the steps (i)-(v) in response to receipt of a single data transmission initiation request at the server.

9. A method as claimed in claim 8, wherein establishing the data streaming connection comprises providing the server with a unique identifier for the mobile electronic device.

10. A method as claimed in claim 9, wherein the unique identifier for the mobile electronic device comprises the International Mobile Equipment Identity (IMEI) of the mobile electronic device.

11. A method as claimed in claim 8, comprising executing a diagnostics application on the mobile electronic device to establish the data streaming connection between the mobile electronic device and the server.

12. A method as claimed in claim 1, wherein the diagnostic test is selected from a plurality of diagnostic tests stored in a database, each diagnostic test being defined by a corresponding algorithm.

13. A method as claimed in claim 12, comprising using a web browser of the mobile electronic device to allow a user of the mobile electronic device to select the diagnostic test from a plurality of diagnostic tests stored in a database and displayed in a webstore accessible via the web browser.

14. A method as claimed in claim 13, further comprising executing a diagnostics application on the mobile electronic device to establish the data streaming connection between the mobile electronic device and the server; and wherein, when executed by the mobile electronic device, the diagnostics application starts, or directs a user of the mobile electronic device to start, the web browser of the mobile electronic device to allow the user of the mobile electronic device to select the diagnostic test from a plurality of diagnostic tests stored in the database and displayed in a webstore accessible via the web browser.

15. A method as claimed in claim 13, comprising transmitting a data transmission initiation request from the webstore to the server in response to selection of the diagnostic test via the web browser.

16. A method as claimed in claim 15, wherein the data transmission initiation request comprises the unique identifier for the mobile electronic device and information which uniquely identifies the selected diagnostic test.

17. A method as claimed in claim 15, comprising initiating steps (i)-(v) in response to receipt of the data transmission initiation request at the server.

18. A method as claimed in claim 12, comprising using a web browser of a computing resource directly or indirectly in communication with, and located remotely from, the mobile electronic device to allow a user of the remote computing resource to select the diagnostic test from a plurality of diagnostic tests stored in the database and displayed in a webstore accessible via the web browser.

19. A method as claimed in claim 1, comprising displaying one or more results generated by the diagnostic test on the mobile electronic device.

20. A method as claimed in claim 1, comprising transmitting one or more results generated by the diagnostic test to the server and/or to a remote computing resource.

21. A non-transitory storage medium having stored thereon a computer program for use in performing a diagnostic test on a mobile electronic device, which computer program, when executed by a processing resource, causes the processing resource to establish a data streaming connection between the mobile electronic device and a server to enable the initiation of a method for use in performing a diagnostic test on the mobile electronic device, the diagnostic test defined by an algorithm which includes a plurality of portions, and the method comprising:

(i) transmitting, from the server to the mobile electronic device, data defining a portion of the algorithm;

(ii) temporarily storing the data received from the server defining a given portion of the algorithm in a volatile memory buffer of the mobile electronic device until a processing resource of the mobile electronic device is ready to execute the given portion of the algorithm;

(iii) moving the data defining the given portion of the algorithm out of the volatile memory buffer of the mobile electronic device to the processing resource for execution;

(iv) executing, on the mobile electronic device, the portion of the algorithm; and (v) repeating steps (i)-(iv) above for each portion of the algorithm until the diagnostic test is complete.

22. The non-transitory storage medium as claimed in claim 21, wherein, once the computer program has established the data streaming connection between the mobile electronic device and the server, the computer program starts, or directs a user of the mobile electronic device to start, a web browser to allow the user to select the diagnostic test from a plurality of diagnostic tests stored in a database.

23. The non-transitory storage medium as claimed in claim 21, wherein the computer program comprises a diagnostics application that is provided on the mobile electronic device, the processing resource is provided with the mobile electronic device, and the user comprises a user of the mobile electronic device.

* * * * *